United States Patent [19]
Wataya

[11] Patent Number: 5,421,311
[45] Date of Patent: Jun. 6, 1995

[54] ENGINE FUEL INJECTION SYSTEM

[75] Inventor: Seiji Wataya, Hyogo, Japan

[73] Assignee: Mitsubishi Denki Kabushiki Kaisha, Tokyo, Japan

[21] Appl. No.: 225,092

[22] Filed: Apr. 8, 1994

Related U.S. Application Data

[63] Continuation of Ser. No. 31,474, Mar. 15, 1993.

[30] Foreign Application Priority Data

Mar. 27, 1992 [JP] Japan .................................. 4-071176

[51] Int. Cl.⁶ .............................................. F02B 23/00
[52] U.S. Cl. ...................................... 123/585; 123/531
[58] Field of Search ................ 123/531, 585, 586, 339

[56] References Cited

U.S. PATENT DOCUMENTS

| | | | |
|---|---|---|---|
| 4,465,050 | 8/1984 | Igashira et al. | 123/531 |
| 4,519,354 | 5/1985 | Katoh et al. | 123/531 |
| 5,121,716 | 6/1992 | Takahashi et al. | 123/531 |
| 5,205,120 | 4/1993 | Obländer et al. | 123/585 |

FOREIGN PATENT DOCUMENTS 57-126556  8/1982  Japan .
58-192957  11/1983  Japan .

Primary Examiner—Noah P. Kamen
Attorney, Agent, or Firm—Sughrue, Mion, Zinn, Macpeak & Seas; Richard C. Turner, Marie-Claire Boisvert

[57] ABSTRACT

In a fuel injection system for an engine, the degree of opening of a throttle valve provided in the suction pipe is detected with a throttle valve sensor. When the load of the engine is smaller than a predetermined value, a control unit operates to close an electromagnetic valve provided in a bypass passageway of the suction pipe, thereby setting the flow rate of air in the bypass passageway to zero or an extremely small value, whereby, when the load of the engine is higher than the predetermined value, the quantities of exhaust gases of hydrocarbon and carbon monoxide are reduced, and when the engine is under a light load, the fuel consumption is reduced.

5 Claims, 2 Drawing Sheets

ENGINE FUEL INJECTION SYSTEM

This is a Continuation of application Ser. No. 08/031,474, filed Mar. 15, 1993.

BACKGROUND OF THE INVENTION

This invention relates to a fuel injection system for an engine.

A multi-point type fuel injecting system is extensively employed for an automobile engine to reduce hazardous components from the exhaust gas of the engine and to improve the output of the latter. On the other hand, in order to reduce the quantity of hazardous exhaust gas essentially containing hydrocarbon (HC), a fuel injection valve (hereinafter referred to as "an injector", when applicable) which jets fuel and atomizes it by mixing air with it, has been put in practical use; that is, a so-called "air assist injector" has been employed.

A conventional engine fuel injecting system is as shown in FIG. 3. In FIG. 3, reference numeral 1 designates an engine; 2 a suction pipe; 3, a throttle valve for controlling the quantity of air supplied into the engine 1 through the suction pipe 2; 4, an injector for jetting fuel into the suction pipe 2; 5, a bypass passageway which receives air from upstream of the throttle valve 3 and supplies it to the injector 4; 6, atomizing means for mixing air with fuel jetted from the injector 4 to accelerate atomization of the fuel; and 7, a control unit which calculates a quantity of fuel supplied to the engine and drives the injector in a pulse mode.

In order to calculate an amount of injection of fuel; that is, an injector drive pulse width, it is necessary to use a suction air sensor for detecting a quantity of suction air, an engine speed sensor, a water temperature sensor, etc. (those sensors being not shown in FIG. 3, because use of them is well known in the art). In addition, description of a quantity-of-fuel calculating process or method will not be made here.

The operation of the fuel injection system thus organized will be described. Particularly, a technique will be described in which fuel jetted from the injector 4 concerning this invention (described later) is atomized by mixing it with air. A purpose of atomization of the fuel is to reduce the quantities of hydrocarbon (HC) and carbon monoxide (CO) in the exhaust gas of the engine. It has been found through experiments that, as droplets of fuel jetted from the injector are reduced in particle size, the combustion of the fuel is improved. That is, as shown in FIG. 4, the quantity of HC or CO gas discharged is substantially proportional to the particle size of the droplets of fuel jetted from the injector.

There are available a variety of fuel atomizing methods, for instance, a fuel atomizing method of air assistance type, a fuel atomizing method of ultrasonic type, and a fuel atomizing method based on a mechanical structure. The fuel atomizing method of air assistance type concerns a fuel injection system of this invention (described later). In the conventional fuel atomizing method of air assistance type, fuel is atomized as follows: As shown in FIG. 3, air is led to the vicinity of the jetting nozzle of the injector 4 from upstream of the throttle valve 3, and the atomizing means 6 operates on the difference in pressure between two portions of the suction pipe 2 which are located upstream and downstream of the throttle valve 3, respectively, to mix the air with fuel jetted from the injector, thereby to atomize the fuel.

In the method, the quantity of assisting air relates to the particle size of droplets of fuel as shown in FIG. 5. That is, the particle size is decreased substantially in reverse proportion to the quantity of assisting air; while the number of idling revolutions per minute (rpm) is increased in proportion to the quantity of assisting air.

As for the atomization of fuel, the quantity of assisting air $Q_a$ should be $Q_{a2}$. However, with $Q_2$, the number of idling revolutions per minute is high, 800 to 100 rpm; that is, fuel is not used economically, and noises may be formed. Hence, it is not desirable to set the quantity of assisting air to $Q_{a2}$. Therefore, unavoidably the sectional area of the bypass passageway 5 is so determined that the quantity of assisting air be $Q_{a2}$. However, if the sectional area of the by pass passageway 5 is determined so, then the fuel will not sufficiently atomized; that is, it will be impossible to sufficiently reduce the quantity of hazardous gases in the exhaust gas of the engine.

In the conventional fuel injection system designed as described above, atomization of fuel is accelerated as the quantify of assisting air is increased; however, increasing the quantity of assisting air suffers from a problem that the number of idling revolutions per minute is increased, so that the fuel is not economically used, and noises are increased. Hence, in practice, the sectional area of the bypass passageway is so determined that the quantity of assisting air allows the number of idling revolutions per minute to be of the order of 600 to 700 rpm. In this case, atomization of the fuel is insufficient, and reduction of the quantity of HC and CO gases in the exhaust gas cannot be made to satisfaction.

On the other hand, in order to maintain the flow rate of air in the bypass passageway 5 higher than a certain value, it is necessary to reduce the leakage of air as much as possible when the throttle valve 3 is closed. However, if the leakage of air is excessively reduced, then a trouble may occur that the throttle valve 3 is caught in the throttle bore.

SUMMARY OF THE INVENTION

Accordingly, an object of this invention is to eliminate the above-described difficulties accompanying a conventional fuel injection system.

More specifically, an object of the invention is to provide a fuel injection system for an engine with which the quantity of hazardous HC and CO gases in the exhaust gas of the engine is reduced, and the effects of the HC and CO exhaust gases can be neglected depending on an engine operating pattern when the engine is idling or under a light load, and the fuel consumption of the engine is improved.

The foregoing object and other objects of the invention have been achieved by the provision of a fuel injection system for an engine which, according to the invention, comprises: an injector arranged downstream of a throttle valve provided in the suction pipe of the engine; a bypass passageway extended from a portion of the suction pipe which is located upstream of the throttle valve through a vicinity of the injection nozzle of the injector to a portion of the suction pipe which is located downstream of the throttle valve; atomizing means for mixing air introduced through the bypass passageway with fuel jetted by the injector; an electromagnetic valve arranged in the bypass passageway in such a manner that it is located upstream of the injector, the electromagnetic valve adapted to control the flow rate of air in the bypass passageway; a load sensor for detecting how the load of the engine is; a control unit for controlling the electromagnetic valve in such a manner that when the load of the engine is equal to or smaller than a predetermined value, the degree of opening of the electromagnetic valve is set to completely zero or an extremely small value.

In the system of the invention, when the engine is idling or under a light load, the control unit operates to close the electromagnetic valve, thereby to reduce the quantity of assisting air to zero or to an extremely small value, whereby the quantities of HC and CO exhaust gases are reduced in absolute value. Hence, the fuel consumption of the engine is decreased, and the engine produces less noise.

The nature, principle, and utility of the invention will be more clearly understood from the following detailed description of the invention when read in conjunction with the accompanying drawings.

BRIEF DESCRIPTION OF THE DRAWING(S).

Figure 4:
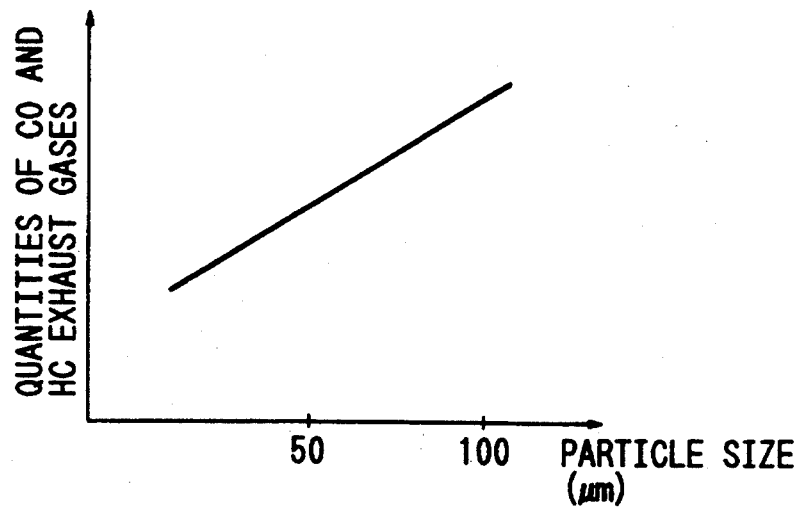
Figure 5:
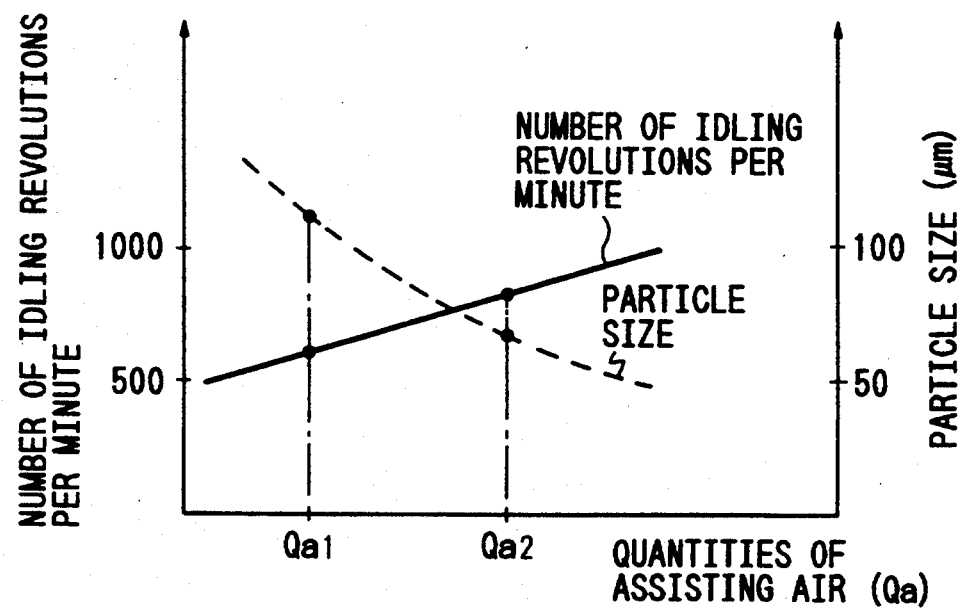

FIG. 4 is a graphical representation for a description of the operation of the conventional fuel injection system, indicating quantities of CO and HC exhaust gases with sizes of fuel droplets; and FIG. 5 is also a graphical representation for a description of the operation of the conventional fuel injection system, indicating quantities of assisting air with particle sizes of fuel droplets and number of idling revolutions per minute.

DETAILED DESCRIPTION OF THE PREFERRED EMBODIMENT

Figure 3:
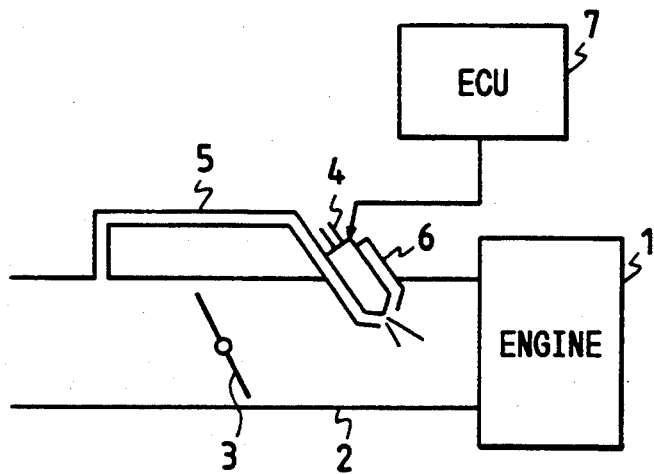
FIG. 3 is an explanatory diagram, partly as a block diagram, showing the arrangement of a conventional fuel injection system for an engine.

A fuel injection system for an engine, which constitutes one embodiment of this invention, will be described with reference to FIG. 1, in which parts corresponding functionally to those which have been described with reference to FIG. 3 are therefore designated by the same reference numerals or characters.

Figure 1:
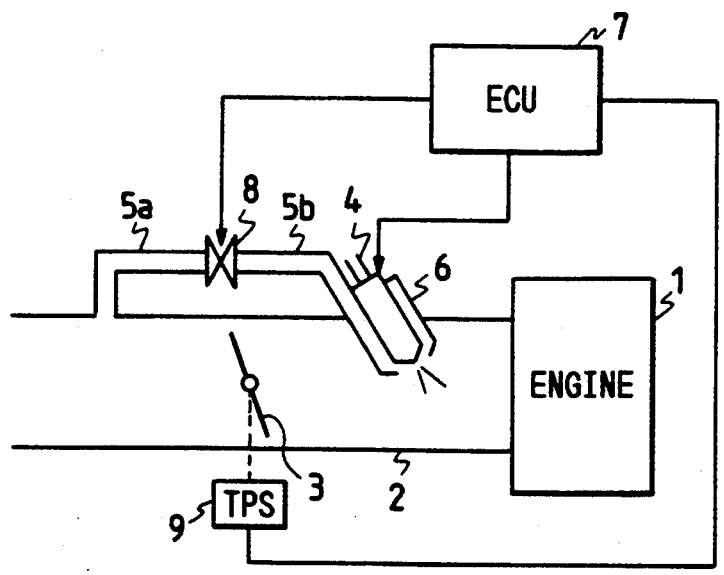
FIG. 1 is an explanatory diagram, partly as a block diagram, showing the arrangement of a fuel injection system for an engine, which constitutes one embodiment of this invention.

As is apparent from comparison of FIG. 1 with FIG. 3, the fuel injection system of the invention (FIG. 1) is different from the conventional fuel injection system (FIG. 3) only in that the bypass passageway 5 is divided into two parts 5a and 5b by an electromagnetic valve 8; that is, the electromagnetic valve 8 is provided in the bypass passageway 5 at the middle, and a throttle opening sensor 9 for detecting the degree of opening of the throttle valve 3 is provided as a load sensor for detecting the load of the engine.

The operation of the fuel injection system thus organized will be described.

Figure 2:
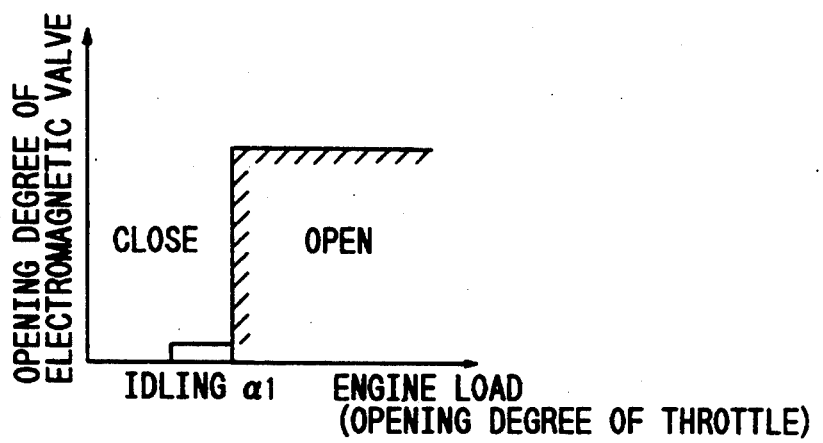
FIG. 2 is graphical representation for a description of the operation of the fuel injection system of the invention, indicating engine loads with opening degrees of an electromagnetic valve.

The throttle opening sensor 9 detects the state of the load of the engine. As is seen from FIG. 2, when the load of the engine thus detected is smaller than a predetermined value $A_1$, the electromagnetic valve 8 is closed. When the electromagnetic valve 8 is closed in this manner, the sectional area of the passageway provided thereby is so set that the flow rate of air in the passageway is zero, or decreased to the extent that it will scarcely affect the increase in the number of idling revolutions per minute of the engine. When the load of the engine detected is larger than the predetermined value $A_1$, the electromagnetic valve is opened. The sectional area of the bypass passageway with the electromagnetic valve opened is set to a relatively large value so that a sufficient quantity of air is supplied for atomization of fuel.

As was described above, in the system of the invention, the throttle opening sensor is employed as an engine load sensor. However, it goes without saying that the same effects can be obtained by using an air flow sensor or a suction pressure sensor.

As was described above, in the fuel injection system of the invention, the electromagnetic valve is provided in the bypass passageway at the middle, and when the engine is idling, or under a light load, the control unit operates to close the electromagnetic valve thereby to decrease the quantity of assisting air to zero or an extremely small value. In other words, when the engine is idling, or under a light load, the flow rate of assisting air in the bypass passageway is made substantially zero, and therefore the assisting air will scarcely contribute to atomization of the fuel. However, when the engine is under a so-called "partial load" higher than the predetermined load, the quantity of air supplied for atomization is larger than in the conventional method. Hence, in this operating range, the fuel is more effectively atomized than in the conventional system, so that the quantity of hazardous gas such as HC and CO discharged from the engine is greatly reduced.

When the engine is idling or under a light load, the quantities of HC and CO exhaust gases are increased when compared with those in the conventional system. However, since the load is small, the quantities of HC and CO exhaust gases are small in absolute value. Hence, the effects of the HC and CO exhaust gases can be disregarded in the whole operating pattern of the vehicle.

On the other hand, when the engine is idling or under a light load, the flow rate of assisting air is substantially zero, and therefore the number of idling revolutions per minute can be reduced. Accordingly, the fuel consumption is decreased, and the engine produces less noise during idling.

While a preferred embodiment of this invention, has been described it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A fuel injection system for an engine comprising:
    an injecting means arranged downstream of a throttle valve provided in a suction pipe of said engine for jetting a fuel into said suction pipe, said injecting means having an injection nozzle;
    a bypass passageway extended from a portion of said suction pipe which is located upstream of said throttle valve through a vicinity of said injection nozzle of said injector to a portion of said suction pipe which is located downstream of said throttle valve;
    atomizing means for mixing air introduced through said bypass passageway with fuel jetted by said injector;

an electromagnetic valve arranged in said bypass passageway in such a manner that said electromagnetic valve is located upstream of said injector, said electromagnetic valve adapted to control the flow rate of air in said bypass passageway;

a load sensing means for detecting a load of said engine;

a control unit for controlling said electromagnetic valve in such a manner that, solely when said engine is in an idling state, the degree of opening of said electromagnetic valve is set to completely zero or an extremely small value, and further when said engine is not in an idling state, the degree of opening of said electromagnetic valve is set to a value larger than said extremely small value.

2. A fuel injection system according to claim 1, in which said load sensing means comprises a throttle opening sensor for detecting a degree of opening of said throttle valve.

3. A fuel injection system according to claim 1, in which said load sensing means-comprises an air flow sensor.

4. A fuel injection system according to claim 1, in which said load sensing means comprises a suction pressure sensor.

5. A fuel injection system for an engine which comprises:

a mixing means for mixing air with fuel injected by an injector which is provided downstream of a throttle valve in the suction pipe of said engine, and a means for controlling the quantity of air supplied by said mixing means according to a load of said engine.

in which solely when said engine is in an idling state, said controlling means controls said mixing means in such a manner that said mixing means is opened to an extremely small value or less, and further when said engine is not in an idling state, said controlling means controls said mixing means in such a manner that said mixing means is opened larger than said extremely small value.

* * * * *